United States Patent Office 2,759,805
Patented Aug. 21, 1956

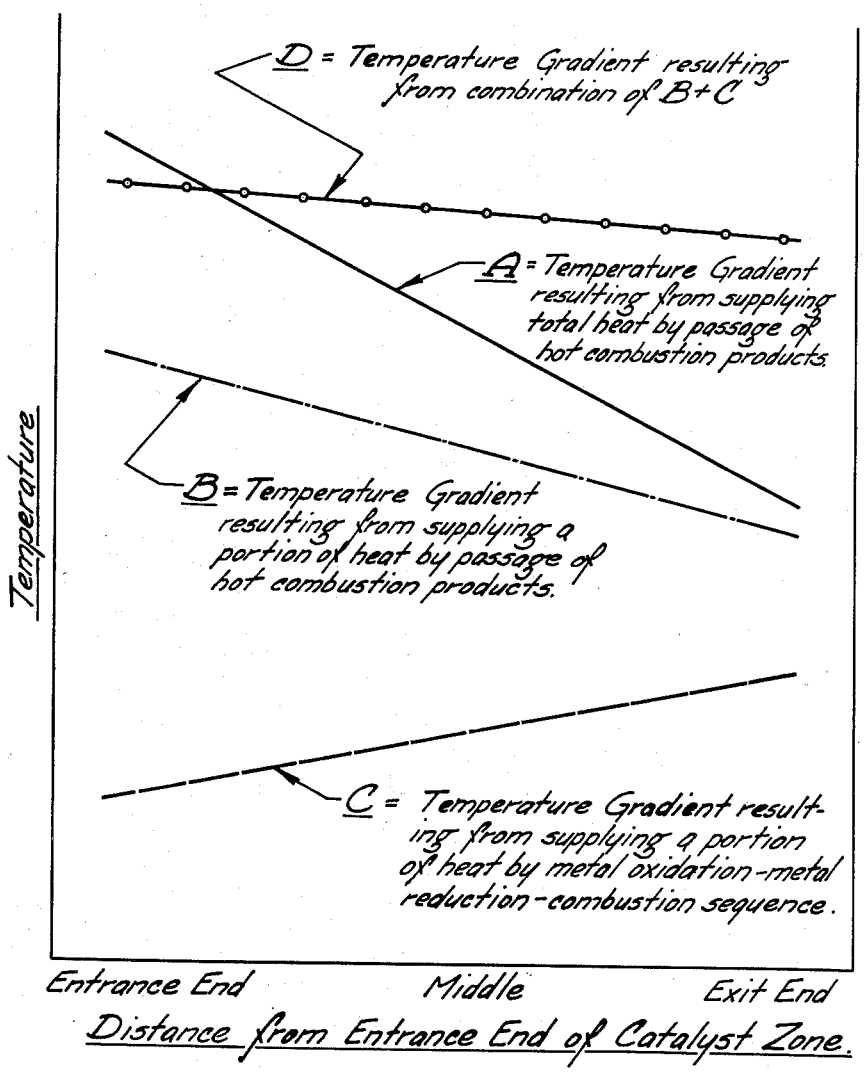

2,759,805

METHOD OF CARRYING OUT CATALYTIC REACTIONS

Harold V. Erickson, Collingswood, N. J., and Francis W. Hartzel, Philadelphia, Pa., assignors, by mesne assignments, to The United Gas Improvement Company, Philadelphia, Pa., a corporation of Pennsylvania Application April 1, 1952, Serial No. 279,934

8 Claims. (Cl. 48—196)

The present invention relates to a method of conducting endothermic reactions by a cyclic procedure involving a stationary catalyst zone; and, more particularly, the invention relates to an improved method of carrying out cyclic catalytic endothermic processes involving the use of a massive stationary zone of catalyst resulting in increased efficiency and capacity during the process. The invention is particularly applicable to the cyclic catalytic reforming of hydrocarbons in the presence of steam to produce a combustible gas comprising hydrogen and carbon monoxide, and hence the invention will be described particularly with reference to such process.

The catalytic conversion of hydrocarbons in the presence of steam into a gas comprising hydrogen and carbon monoxide is well known. One of the methods suggested in the past has involved continuously passing the hydrocarbon and steam through metal tubes containing a nickel or cobalt catalyst. Heat is supplied from an external source, passing through the walls of the tubes and into the catalyst mass therein. The hydrocarbon and steam, passing continuously through the catalyst-containing tubes, react therein to form hydrogen and carbon monoxide.

Such continuous reforming procedures possess certain inherent disadvantages. The equipment used in such procedures is very costly due to the necessity of producing the tubes from high grade metal alloys. Moreover, as stated, the heat for the reaction must be conducted through the tube walls into and through the catalyst mass. The conductivity of the catalytic material in discrete particle form is not high so that the metallic tubes, if the catalyst is held at a high temperature of, for example, from 1600° F. to 1800° F., must operate at a temperature not very far below the maximum safe temperature of the most resistant metal alloy tubes and necessarily higher than the reaction temperature of the catalyst. In addition, not only are such high alloy metal tubes expensive and subject to considerable maintenance costs, but the mutliplicity of tubes requires a multiplicity of valve connections and flow controls which in turn add to the expense of installation.

Fluidized processes have also been suggested wherein the catalyst in fine particle form is continuously circulated from a reaction chamber to a regeneration chamber and back again. Again the equipment for use in such procedure is complicated and costly, particularly due to the apparatus required for circulating and controlling the flow of the catalyst, and for disengagement of the catalyst particles from the gases.

There have been devised cyclic methods for the catalytic reforming of hydrocarbons in the presence of steam. In these procedures the catalyst material, held in a massive stationary layer or layers in a refractory-lined chamber, is alternately heated by passing hot gases therethrough. In between these heating periods, the hydrocarbon and steam are passed through the catalyst bed wherein the endothermic reaction takes place. Such cyclic procedures represent a distinct improvement over the above-discussed procedures providing greater flexibility, requiring inexpensive equipment and readily providing a carbon-free gas.

In the cyclic methods heretofore proposed wherein a massive, stationary catalyst zone in employed, however, there is a limitation with respect to heating of the catalyst. It is known that, where the passage of hot combustion products through the catalyst zone is relied upon for the heating of the material, the exit end of the zone is much cooler than is the entrance end. With a catalyst zone of about four feet in depth, for example, the average temperature differential between the entrance and exit portions thereof is in the neighborhood of about 650° F. This marked drop in temperature through the catalyst zone in the direction of gas flow means that the latter, cooler portion of the catalyst zone is performing a compartively insignificant function, and that the extent of the gas-making portion of the cycle is limited to the utilization of the heat stored in the hotter entrance portion of the catalyst zone. Because of the limitations with respect to the maximum safe temperature to which the catalyst zone can be heated without injury to the catalyst, the overall temperature level of the catalyst zone cannot be raised significantly by passing hot gases therethrough alone in order to provide higher temperatures in the exit portion of the catalyst zone without overheating the entrance portion of the catalyst zone. Such heating problems are specific to the described cyclic procedures employing massive catalyst beds and are not encountered in the above-discussed tubular and fluidized processes.

As will be apparent from the following disclosure, the process of the present invention provides a means of reducing the temperature differential between the exit and entrance portions of the catalyst zone. As a result of this, substantial improvements with respect to gas-making capacity, efficiency and other features, are provided.

It is a principal object of the present invention to provide a novel cyclic method for carrying out endothermic catalytic reactions which represents an improvement over prior cyclic reforming procedures involving a stationary catalyst zone.

Another object of the invention is to provide a cyclic method of catalytically reforming hydrocarbons in the presence of steam by which temperature conditions more conducive to highly efficient reformation are provided in the catalyst zone.

Still another object of the invention is to provide a cyclic method of catalytically reforming hydrocarbons wherein the temperature differential between the exit and entrance ends of the catalyst zone normally encountered in passing hot gases alone through the catalyst zone is substantially reduced.

A further object is to provide a cyclic method of catalytically reforming hydrocarbons in the presence of steam providing improved gas-making capacity and efficiency as compared to prior cyclic methods.

Other objects will become apparent from a consideration of the following specification and claims.

It has been found, that, in cyclic endothermic processes employing a massive, stationary zone of catalyst comprising an easily oxidizable metal, such as nickel or cobalt, a portion of the required heat can be stored cyclically in the catalyst mass itself by the passage into the hot catalyst mass of a controlled amount of free oxygen to convert the catalyst metal to the oxidized form with the generation of heat, with an increase in the temperature of the exit portion of the catalyst zone without overheating the entrance portion of the catalyst zone; and that the heat so stored is not dissipated by the subsequent passage of a reducing gas through the oxidized catalyst zone to reduce the oxide to highly, catalytically active elemental form for the endothermic reaction portion of the cycle. Thus, the storage of heat in this manner, in conjunction with the passage of hot gases through the catalyst zone, results in the reduction of the temperature gradient through the catalyst zone. In accordance with the present invention therefore, at a step in the cycle other than the actual endothermic reaction portion thereof, a controlled amount of free oxygen is passed into the catalyst zone converting catalyst metal to oxide form with the generation of heat, and then an oxidizable reducing gas is passed into the catalyst bed converting the catalyst metal oxide to elemental form with the simultaneous oxidation of the oxidizable gas. Following the desired storage of heat in the catalyst zone, and the reduction of oxide to elemental form, the endothermic reaction portion of the cycle is effected by passing the reactants, such as hydrocarbon in the gaseous state and steam through the hot catalyst zone where catalytic reaction with the utilization of heat occurs.

The process of the present invention utilizes an oxidation-reduction-combustion sequence in order to store a portion of the heat required for the endothermic reaction in the catalyst zone. As stated, during a portion of the cycle other than the endothermic reaction portion, catalyst metal is first oxidized by passing free oxygen into the catalyst zone. This oxidation generates heat within the catalyst mass itself. Still at a portion of the cycle other than the endothermic reaction portion and after the oxidation step, an oxidizable reducing gas is passed into the catalyst zone reducing the oxide to highly active elemental form with the simultaneous combustion of the oxidizable gas by virtue of the oxygen liberated by the metal oxide. This subsequent reduction of the catalyst metal oxide, of course, requires heat; and, theoretically the amount of heat required for the reduction is the same as, and offsets that generated by the oxidation of the metal. However, the heat required for reduction of the catalyst metal oxide is approximately offset by the heat generated by the simultaneous oxidation (combustion) of the oxidizable reducing gases passing through the catalyst bed. The net result is the storage of heat in the catalyst mass, the net heat generated being substantially equivalent to that caused by oxidation of the catalyst. The stored heat is utilized during the subsequent endothermic portion of the cycle. As will be discussed more fully hereinafter a portion of the heat necessary to maintain the cyclic operation is provided by passing hot gases through the catalyst zone, and it is heat obtained from such hot gases in conjunction with the net heat stored during the above-mentioned oxidation-reduction-combustion sequence that produces the total heat requirements of the process. As will also be discussed more fully hereinafter the amount of oxygen passed through the catalyst zone for oxidation of the catalyst with the generation of heat in conjunction with the passage of hot gases through the catalyst zone also for the storage of heat, must be controlled in relation to the endothermic requirements of the cycle in order to provide the improved results referred to herein.

The storage of heat in a massive, stationary catalyst zone in the manner described provides many advantages over the conventional cyclic method of storing heat in such zones, that is, solely by the passage of hot gases through the catalyst zone. In the first place, heating such catalyst zone solely by passing hot gases therethrough necessarily produces a higher temperature in the inlet portion of the catalyst zone than at the outlet portion thereof. The disadvantage of such a temperature differential manifests itself in several ways. For example, in reformation of hydrocarbons in the presence of steam to provide a combustible gas comprising hydrogen and carbon monoxide, the major portion of the reforming reaction takes place at the inlet portion of the catalyst zone where the reactants first contact hot catalyst. Thus, the gases which contact the cooler outlet portion of the catalyst zone are relatively lean with respect to hydrocarbons. Under such conditions higher temperatures would be required in order more completely to convert the remaining hydrocarbon; however, such higher temperatures in the outlet portion of the catalyst zone are not obtainable by the conventional method of heating. In addition, also because of the preponderant reaction taking place in the inlet portion of the catalyst zone, the heat in that portion of the zone is relatively quickly dissipated. Because the heat in the outlet portion of the catalyst zone is not sufficient to maintain the reaction at the desired rate, the dissipation of heat in the inlet portion of the catalyst zone limits the hydrocarbon-reforming capacity of the catalyst zone. A further disadvantage inherent in relying solely upon the sensible heat of hot gases for the heating of the catalyst zone, is the relative inefficiency by which such heating is attained. In supplying heat rapidly to an inert body by passing hot gases in contact therewith, the heating gases must be at a materially higher temperature than the body to be heated, and the body never becomes as hot as the gases. This means that in heating a catalyst zone solely by passing hot gases therethrough much of the heat is lost as sensible heat in the effluent gases.

With the process of the invention, on the other hand, a more even temperature gradient over the catalyst zone may be provided. Since a large amount of the heat supplied in the catalyst zone is supplied in effect through oxidation of the catalyst metal itself, the difference between the inlet and outlet temperatures of the catalyst zone becomes materially less. In other words, in accordance with the method of the present invention, the temperature at the outlet portion of the catalyst zone more closely approaches that of the inlet portion. This means that in reforming hydrocarbons, for example, residual, unreformed hydrocarbon in the reaction gases passing through the outlet portion of the catalyst zone can be more completely reformed and/or that the catalyst zone has a greater gas-making capacity. In addition, the generation of heat within the catalyst mass in accordance with the present process, wherein the catalyst metal is itself a source of heat, is a more efficient means of heating the mass than solely by means of hot gases passing therethrough. This is shown by the fact that the total air employed in accordance with the present process is actually substantially less than the air required to burn a fuel to provide hot gases for heating the catalyst to reaction temperature in accordance with prior procedures.

The reduction in the temperature gradient between the exit and entrance portions of the catalyst zone discussed above is illustrated in the figure of the drawing. The figure illustrates diagrammatically approximate relative temperature gradients produced in a massive, stationary catalyst zone by different types of heating. Curve A represents the relative temperature gradient provided when all the heat required for the endothermic reaction is supplied by the passage of hot combustion products into and through the catalyst zone in accordance with the prior art. By such a procedure, as illustrated by curve A, the temperature in the exit portion of the catalyst zone is much lower than that in the entrance portion. Curve B illustrates the temperature gradient provided when only a portion of the required heat is supplied by the passage of hot combustion products into and through the catalyst zone in accordance with one part of the heating step of the present process. As is the case with curve A, higher temperatures are provided in the entrance portion of the catalyst zone than in the exit portion. Curve C illustrates the relative temperature gradient provided by the metal-oxidation, metal-reduction, combustion sequence employed in accordance with the present process. Because the heat is generated within the catalyst zone and tends to be carried toward the exit end of the catalyst zone with the flowing gases, higher temperatures are concentrated in the exit portion of the catalyst zone than in the entrance portion. The heating of the catalyst zone in accordance with the process of the present invention, by a combination of passing hot products of combustion into and through the catalyst zone producing a relative temperature gradient illustrated by curve B and of the metal-oxidation, metal-reduction, combustion sequence producing a relative temperature gradient as illustrated in curve C, results in a final temperature gradient at the end of the heating portion of the cycle illustrated by curve D. As is illustrated by curve D, the temperature differential between the exit and entrance portions of the catalyst zone provided in accordance with the present invention is very much less than that resulting from prior heating operations wherein the passage of hot products of combustion into and through a catalyst zone is the sole source of heat.

The foregoing paragraphs are by way of describing the observable differences in conditions within the catalyst zone. The importance features of the present process lie in the improved results obtained processwise caused by the altered conditions. Thus, it has been found that by operating in the manner described herein in the reforming of hydrocarbons in the presence of steam, the gas-making capacity and efficiency of a given catalytic reformer may be materially increased as evidenced by substantial increases in the amount of reformed gas produced. In view of the improved results obtained it is also believed that the cyclic oxidation-reduction of the catalyst also maintains the catalyst in a state of maximum activity not only through constant maintenance of the catalyst surface free from sulfur and other contaminants but also by physical conditioning of the catalyst metal whereby crystal growth thereof is prevented.

The process of the present invention involves, as stated, the use of a massive stationary bed of catalyst material. By "massive" is meant a relatively deep bed or beds of catalyst material, for example, at least about two feet in depth, and having a substantial diameter of at least about two feet. The maximum depth of the catalyst zone is relatively unimportant and is governed by economical and engineering design considerations. Generally, however, the catalyst zone depth is not over about six feet, with the process of the present invention being particularly applicable to catalyst zones having a depth between about three and about five feet. By "stationary" is meant that the catalyst material remains at rest and that the position of each catalytic body is more or less fixed with respect to the others as distinguished from fluidized processes wherein the problems are different and wherein the improvements provided in accordance with the present invention are not applicable.

The catalyst metal employed in accordance with the present invention will be selected from the group consisting of nickel and cobalt, preferably the former. A suitable refractory carrier is employed, upon which the catalytic material is disposed and throughout which it may be distributed. Difficultly reducible oxides such as alumina, silica, magnesia, calcium oxide, titanium oxide, chromium oxide, oxides of rare earth metals such as, for example, thoria, ceria, and/or others may be present. Compounds such as chromates and silicates, for instance zirconium silicate, may be employed. Particularly advantageous catalytic bodies in this connection are those in which the catalyst metal is distributed upon refractory bodies having a porosity between about 25% and about 60%, preferably between about 35% and about 45%, with a concentration of catalyst metal between about 2% and about 10%, preferably between about 4% and about 7%.

One method of catalyst preparation involves the precipitation of the catalyst metal in the form of a salt upon finely divided carrier material, calcination to produce the oxide of the catalyst metal, pelleting or the making of extruded shapes from a paste of the calcined material, and reduction of the oxide at elevated temperatures to metallic form, either as a step in the preparation of the catalyst or after it has been placed in the gas making equipment. In the preparation of another type of catalyst, preformed refractory bodies, such as alundum balls, and the like, are impregnated with a salt of the catalytic metal, and thereafter the impregnated shapes are calcined to form the oxide of the metal which is subsequently reduced.

The catalyst employed in accordance with the present invention may be produced by any desired procedure which forms no part of the present invention. However, it is preferred that catalysts be in the form of discrete bodies, such as spheres, cubes, cylinders, irregularly-shaped lumps, and the like. Spherical shaped catalytic bodies are preferred. The catalyst bodies will be relatively small in size, catalyst bodies having an average diameter of between about ¼ and about 1 inch, or its equivalent, being suitable. Preferably the catalyst bodies have an average diameter between about ⅜ inch and about ¾ inch, or the equivalent.

The process of the present invention, as stated, is cyclic comprising an exothermic heating step and an endothermic reaction step. The heating portion of the cycle will comprise the passage of hot gases through the catalyst zone supplying a portion of the heat requirements through transmission of sensible heat from the hot gases to the catalyst mass, the passage of free oxygen through the catalyst mass to oxidize the catalyst metal with the generation of heat in situ in the catalyst mass and the subsequent passage of oxidizable gases through the catalyst zone to reduce the oxidized catalyst with the simultaneous combustion of the oxidizable gases. The passage of hot gases through the catalyst zone follows conventional procedure in a cyclic process with the exception, however, that such gases supply only a portion of the heat required. The hot gases are provided by the combustion of a fuel and the passage of the resulting hot products of combustion through the catalyst zone.

With respect to the passage of free oxygen through the catalyst zone to oxidize the catalyst metal, such free oxygen may be passed through the catalyst zone at any time during the cycle other than the endothermic reaction step, and, of course, at a time prior to the reduction-combustion step wherein oxidized catalyst is reduced to elemental form. The passage of free oxygen through the catalyst zone may be accomplished by a wide variety of procedures, the important feature being only the total amount of free oxygen per cycle passed through the catalyst zone on the basis more fully discussed hereinafter. Thus, the passage of free oxygen may be a step separate and distinct from the passage of the hot gases through the catalyst zone. In other words, air, or other oxygen-containing gas, by itself or in admixture with another gas, such as steam, may be passed through the catalyst zone before or after, or at some intermediate point in the heating portion of the cycle during which hot combustion products are passed through the catalyst zone. On the other hand, the free oxygen may be passed through the catalyst zone in conjunction with the passage of the hot combustion products therethrough. For example, free oxygen may be passed through the catalyst bed during any portion or all of that period during the heating portion of the cycle during which the hot combustion products are passed through the catalyst zone. A convenient method of providing free oxygen in such procedure is to burn the fuel during the production of the hot combustion products in the presence of a controlled excess of air so that the products of combustion passing through the catalyst zone will contain a controlled amount of free oxygen. As stated, free oxygen may be passed through the catalyst zone during only part of that period of the heating portion of the cycle during which hot combustion products are passed through the catalyst zone, for instance, during the first part of that period during which hot combustion products are passed through the catalyst zone the fuel may be burned in the presence of excess air as described.

As stated, before the actual endothermic portion of the cycle, e. g. the reforming step of a hydrocarbon reforming cycle, can take place, the oxidized catalyst must be reduced to the elemental state, and this is accomplished by the passage of oxidizable reducing gases through the catalyst bed at a point in the cycle after the oxidation of the catalyst and before the endothermic reaction portion of the cycle. This reduction of the catalyst metal oxide to elemental form is accompanied simultaneously with the combustion of the oxidizable gases by virtue of the oxygen released by the oxidized catalyst. The oxidizable gases passed through the oxidized catalyst zone may be selected from a wide variety of gaseous materials, the only requirement being that they unite readily with oxygen of the catalyst metal oxide under the temperature conditions obtaining. Examples of such gases are hydrogen, carbon monoxide, gaseous hydrocarbons, particularly methane, and the like. Mixtures of two or more such gases may be employed if desired, and, as is often the case, mixtures of such gases with other, inert, gases, such as nitrogen, carbon dioxide, and the like, may be used. A gas comprising oxidizable gases may conveniently be produced by burning a fuel in the presence of insufficient air to support complete combustion. Advantageously, such products of incomplete combustion may be produced during that part of the heating portion of the cycle during which a fuel is burned to provide hot combustion products for passing through the catalyst zone. Particularly advantageous practice in this regard is to conduct the latter portion of the burning of the fuel in the production of the heat storage combustion products, as referred to above, in the presence of insufficient air to support complete combustion. On the other hand, particularly in the case of reforming hydrocarbons, a portion or all of the oxidizable gas may be provided just prior to the reforming step when the first portions of the hydrocarbon reactant, contacts the catalyst zone. For example, when the hydrocarbon reactant is admitted to the catalyst zone in preparation for the reforming portion of the cycle, the first portions of such hydrocarbon reactant may be relied upon to reduce the oxidized catalyst metal with the simultaneous combustion of the hydrocarbon. In this case although hydrocarbon is admitted to the catalyst zone, it may be that at least a portion thereof is broken down, possibly by virtue of unoxidized catalyst, into hydrogen and carbon monoxide which in turn reduce the oxidized catalyst.

Since the procedure is cyclic involving an exothermic heating stage and an endothermic reaction stage, the total heat storage per cycle must be substantially balanced with the heat utilized per cycle. The heat utilized per cycle during reforming of hydrocarbons is directly related to the amount of hydrocarbon reformed to hydrogen and carbon monoxide. Thus, if the reformation taking place during the reforming portion of the cycle is insufficient substantially to balance the heat stored in the catalyst zone per cycle, the temperature of the catalyst after a series of cycles will become excessive leading to its sintering and ultimate destruction. Accordingly, with regard to the broader aspects of the present process as applied to the reforming of hydrocarbons, the amount of free oxygen passed into the catalyst zone is controlled in relation to the amount of hydrogen and carbon monoxide produced during reforming so as to maintain temperatures in the catalyst zone at below the sintering temperature of the catalyst. In general, the temperatures in the catalyst zone must be maintained below about 2500° F., and preferably below about 2100° F. The foregoing is a measure of the maximum amount of oxygen that may be passed to the catalyt zone per cycle.

With respect to the minimum amount of free oxygen that may be passed to the catalyst zone per cycle, the oxidation-reduction-combustion sequence of the present invention, as stated, decreases the temperature differential between the exit and entrance portions of the catalyst zone normally obtained when oxygen-free heating gases alone are relied upon to heat the catalyst zone; and it has been found that substantial improvements are obtained in accordance with the present invention when relatively small amounts of free oxygen are employed so as to reduce the difference between the mean temperature in the exit portion of the catalyst zone and the mean temperature in the entrance portion of the catalyst zone, at the end of the heating period of the cycle, to about 475° F. or less. In reforming hydrocarbons, if the proportion of oxygen to hydrogen and carbon monoxide produced is increased, the temperature differential is further reduced, until for all practical purposes it is substantially eliminated, that is, until the mean temperatures in the exit and entrance portions of the catalyst zone are substantially equal. In some cases the mean temperature in the exit portion of the catalyst zone may even exceed that in the entrance portion.

The foregoing control of the amount of free oxygen employed has been expressed in terms of mean temperature difference between the exit and entrance portions of the catalyst zone since such is readily measurable. Quantitatively, in the case of hydrocarbon reformation, it has been found that the amount of free oxygen passed into the catalyst zone per cycle should not exceed about 180 cubic feet per thousand cubic feet of hydrogen plus carbon monoxide produced during the reforming portion of the cycle. While advantageous features of the present invention may be realized with amounts of free oxygen as low as about 15 cubic feet per thousand cubic feet of hydrogen plus carbon monoxide, particularly advantageous results are obtained when the amount of free oxygen employed per cycle is between about 50 and about 100 cubic feet per thousand cubic feet of hydrogen and carbon monoxide produced.

Reference has been made herein to the amount of oxygen passed into the catalyst zone. It has been found that the amounts of oxygen specified herein are generally less than that theoretically required for complete oxidation of the catalyst bed, and that such oxygen, by virtue of the high reactivity of the catalyst metal, substantially completely combines with the catalyst. Thus, the amounts of oxygen passed into the catalyst bed generally correspond substantially to the amount of oxygen actually reacted with the catalyst.

The amount of oxidizable gas passed through the oxidized catalyst zone should be that sufficient to reduce the oxide of the catalyst metal to elemental form. Thus, the exact amount of oxidizable gases per cycle will depend upon the amount of catalyst oxidized and hence upon the amount of free oxygen per cycle previously passed into the catalyst zone. Amounts of oxidizable gases in excess of that required for reduction of the oxidized catalyst zone may be passed through the catalyst zone although no advantage is obtained by passing amounts of oxidizable gases substantially in excess of that required for reduction in the catalyst zone. In the event the oxidizable gases comprise hydrocarbons, amounts in excess of that required for reduction of the catalyst will become reformed in the catalyst zone and the reformed products may be directed to gas recovery equipment.

As stated, in accordance with the process a portion of the required heat in the catalyst zone is supplied by passing hot gases through the catalyst zone, and a portion is supplied by the above-described catalyst oxidation procedure. While the exact proportions of heat supplied to the catalyst by the two means may vary widely depending upon other factors which will occur to those skilled in the art, it has been found in practice that from about 10% to about 50% of the heat stored in the catalyst zone should be supplied by the oxidation of the catalyst as described herein. Optimum results have been obtained when from about 15% to about 30% of the heat has been so supplied, the remainder being supplied by the hot gases passing through the catalyst zone. As stated above, care is taken to prevent temperatures in the catalyst zone from reaching a point where the catalyst is deleteriously affected. It will be realized, however, that sufficient heat must be stored in the catalyst zone to sustain the endothermic reaction. The particular temperature to which the catalyst zone is heated will depend, as well known to those skilled in the art, upon various factors including the nature of the reactant, flow rate of reactants, and the like. When natural gas is employed as the hydrocarbon reactant for reforming, for example, the average temperature of the catalyst zone should be at least about 1500° F. When a hydrocarbon heavier than methane is employed as the reactant, it may be desirable to provide a somewhat lower average temperature in the catalyst zone during the heating step, and in some cases an average temperature as low as about 1000° F. may be sufficient.

Following the heating of the catalyst zone to the desired temperature, including the described oxidation-reduction-combustion sequence, the endothermic portion of the cycle is commenced by passing the reactants into the catalyst zone. Where a hydrocarbon is to be reformed into a combustible gas comprising hydrogen and carbon monoxide, the reactants will comprise hydrocarbon in the gaseous state and steam. In the catalyst zone a portion of the hydrocarbon reacts catalytically with the steam to provide hydrogen and carbon monoxide. Carbon dioxide may also be formed, particularly when air is employed during reforming. When air is employed, nitrogen will also appear in the product gas. When incomplete reforming is desired variable amounts of gaseous hydrocarbons will also be present in the product gas.

The hydrocarbon material reformed in the gas-generating portion of the cycle may comprise normally gaseous hydrocarbon material such, for example, as methane, ethane and propane or butane and heavier hydrocarbon distillates such as gasoline and gas oil. Corresponding unsaturated hydrocarbons may be present in any desired concentration, such, for example, as ethylene, propylene, butylene, etc. When normally liquid hydrocarbons are employed, appropriate vaporizing means will be relied upon to convert the hydrocarbon to the gaseous state. Natural gas, which is primarily methane and refinery oil gas, which is primarily methane and ethylene are among the hydrocarbon materials which may be employed. Natural gas, because of its availability is particularly preferred as the hydrocarbon reactant.

With respect to the fuel employed during the heat-storage period of the cycle, it may be any fluid—that is, gaseous or liquid—combustible. Hydrocarbons, such as those mentioned above, and especially natural gas, are particularly satisfactory, although gaseous fuel not rich in hydrocarbon, such as water gas, producer gas, oil gas, and the like, may also be used. Liquid hydrocarbons, such as fuel oil, gas oil, gasoline, kerosene, tar, and the like, may be employed if desired. In the event a liquid fuel is employed, conventional spraying or other vaporizing means may be utilized to facilitate combustion.

The proportion of steam to hydrocarbon reactant employed during the reforming portion of the cycle generally runs between about .8 mol and about 5 mols, and preferably between about 1.5 and about 2.5 mols, of steam for each mol of carbon in the hydrocarbon reactant. When air is employed during the reforming portion of the cycle, the proportion of steam to hydrocarbon required may be decreased in which case as low as about .8 mol of steam per mol of carbon in the hydrocarbon reactant may be employed.

Some air may be, and preferably is, employed during the reforming portion of the cycle. The amount of air so employed will be generally less than about 2 mols thereof per mol of carbon in the hydrocarbon reactant and in most cases will be less than about 1 mol thereof per mol of carbon in the reactant. Preferably, the amount of air employed during the reforming portion of the cycle is between about .1 and about .6 mol thereof per mol of carbon in the hydrocarbon reactant.

The foregoing description has dealt primarily with the heating of a catalyst zone. It will be realized, that one or more non-catalytic preheating zones may be employed to preheat, at least to some extent, one or more of the reactants employed during the endothermic reaction portion of the cycle. Likewise, although the oxidation-reduction-combustion sequence has been described principally in connection with the treatment of nickel or cobalt reforming catalyst material, it will be realized that, insofar as the generation of heat is concerned, other easily oxidizable-reducible metals may be used in conjunction with the nickel or cobalt either distributed throughout the catalyst bed or positioned elsewhere in the gas flow path.

The process of the present invention will be more readily understood from a consideration of the following specific examples.

EXAMPLES 295 cubic feet of catalyst are retained in a layer four feet nine inches deep in a refractory-lined shell. The catalyst consists of nickel-coated alundum spheres having a diameter of about ½ inch. A 2.53 minute cycle is employed comprising a heating period or "blow," and a reforming period. Between the blow and the reforming period is a brief steam purge.

Several different runs are made, each run lasting about three days and involving many cycles. The runs differ as to the amount of free oxygen passed into the catalyst zone. In one run, referred to herein as run "A," no free oxygen is passed into the catalyst zone, and the catalyst zone is heated solely by passing hot combustion products therethrough in accordance with prior practice. In the other runs, by burning the fuel (natural gas) in the presence of various amounts of excess air, various amounts of free oxygen are present in the hot combustion products passing through the catalyst zone during the entire blow. The amounts of free oxygen so passed into the catalyst zone are the following percentages (wet basis) of the hot combustion products: 1.35%, 1.75%, 2.52%, 3.05%, 3.65% and 4.27%, respectively, and correspond to the following amounts of free oxygen (in cubic feet) per thousand cubic feet of hydrogen plus carbon monoxide formed during the run: 21.7, 26.2, 36.2, 44.3, 51.5 and 65.4, respectively. These runs are referred to herein as runs B, C, D, E, F and G, respectively.

The hydrocarbon reactant employed is natural gas and is fed at the rate of 2600 cubic feet per minute to the catalyst zone. Steam is also employed during the run at the rate of 150 pounds per minute. The first portions of the natural gas admitted to the catalyst zone are relied upon to reduce the oxidized catalyst to elemental form and the oxidized hydrocarbon products are directed to the gas recovery equipment with the reformed gas.

Data obtained from these runs are tabulated as follows:

tions of each portion of heat supplied are controlled to provide a mean temperature difference between the entrance and exit portions of the catalyst zone of substantially less than about 475° F.

|  | A | B | C | D | E | F | G |
|---|---|---|---|---|---|---|---|
| Oxygen (Dry), Percent | 0.0 | 1.6 | 2.1 | 3.0 | 3.6 | 4.3 | 5.0 |
| Waste Gas Analysis (Wet Basis) Calc.: | | | | | | | |
| $H_2O$, Percent | 18.2 | 17.10 | 16.75 | 16.10 | 15.70 | 15.10 | 14.53 |
| $CO_2$, Percent | 9.8 | 9.25 | 9.10 | 8.72 | 8.45 | 8.15 | 7.90 |
| $O_2$, Percent | 0.0 | 1.35 | 1.75 | 2.52 | 3.05 | 3.65 | 4.27 |
| $N_2$, Percent | 72.0 | 72.3 | 72.40 | 72.66 | 72.80 | 73.10 | 73.30 |
| Free Oxygen, ft.$^3$/cycle | | 165 | 226 | 331 | 416 | 494 | 632 |
| $H_2$+CO, ft.$^3$/cycle | 6,500 | 7,600 | 8,620 | 9,150 | 9,400 | 9,600 | 9,660 |
| Oxygen/M $H_2$+CO ft.$^3$ | 0 | 21.7 | 26.2 | 36.2 | 44.3 | 51.5 | 65.4 |
| Total Air, ft.$^3$/cycle | 12,000 | 12,750 | 13,000 | 13,450 | 13,700 | 14,000 | 14,300 |
| Total Air/M $H_2$+CO ft.$^3$ | 1,850 | 1,680 | 1,510 | 1,470 | 1,460 | 1,460 | 1,480 |
| Product Gas Analysis (Converted to 5% $N_2$): | | | | | | | |
| $CO_2$, Percent | 2.9 | 3.6 | 4.8 | 4.3 | 4.9 | 4.8 | 4.0 |
| $O_2$, Percent | 0.4 | 0.4 | .4 | .4 | .4 | .4 | .4 |
| CO, Percent | 17.0 | 17.6 | 17.8 | 19.0 | 20.0 | 19.4 | 20.6 |
| $CH_4$, Percent | 20.6 | 13.3 | 9.3 | 6.7 | 6.4 | 6.6 | 4.8 |
| $H_2$, Percent | 54.1 | 60.1 | 62.7 | 64.6 | 63.3 | 63.8 | 64.6 |
| $N_2$, Percent | 5.0 | 5.0 | 5.0 | 5.0 | 5.0 | 5.0 | 5.0 |
| $H_2$+CO produced per day M ft.$^3$ | 3,750 | 4,600 | 4,800 | 5,250 | 5,400 | 5,600 | 5,650 |

Considerable modification is possible in the combinations of the various factors involved, including nature of catalyst, nature of reactants, procedural techniques, and the like, without departing from the scope of the present invention.

What is claimed is:

1. In a cyclic process wherein a massive, stationary zone of catalyst comprising a metal selected from the group consisting of cobalt and nickel is alternately heated by passing heating gases thereinto, and then said heated stationary catalyst zone, with said metal in elemental form, and the heat stored therein are employed to effect a gas phase catalytic reaction with the abstraction of heat from said stationary catalyst zone, the method of heating said stationary catalyst zone and controlling temperatures therein which comprises burning a fuel and passing the resulting hot combustion products into and through said stationary catalyst zone to store therein a portion of the heat required for the reaction and passing free oxygen into said stationary catalyst zone in the same direction as the said passage of hot combustion products to oxidize elemental metal in said catalyst zone with the generation of heat in situ in said stationary catalyst zone, and then passing oxidizable gas into said stationary catalyst zone in an amount to reduce said oxidized metal to elemental form with the simultaneous exothermic oxidation of said oxidizable gas in said stationary catalyst zone by virtue of the oxygen in said oxidized metal, the amount of free oxygen passed into said catalyst zone being sufficient to provide, as the result of said metal-oxidation, metal-reduction and gas-oxidizing sequence, another portion of heat amounting to between about 10% and about 50% of the total heat supplied to said catalyst zone, the heat distribution in said stationary catalyst zone by virtue of said first-mentioned portion of heat supplied tending to provide a falling temperature gradient from the entrance to the exit of said stationary catalyst zone and the heat distribution in said stationary catalyst zone by virtue of said second mentioned portion of heat supplied tending to provide a rising temperature gradient, the proportions of each portion of heat supplied being controlled to provide, without overheating said entrance portion of the catalyst zone, a mean temperature differential between the entrance and exit portions of the catalyst zone substantially less than that resulting from the heating of said stationary catalyst zone solely by passing hot oxygen-free combustion products therethrough in the stated direction.

2. The process of claim 1 wherein the catalyst comprises nickel, wherein the catalyst zone has a depth between about 2 and about 6 feet, and wherein the proportions of each portion of heat supplied are controlled to provide a mean temperature difference between the entrance and exit portions of the catalyst zone of substantially less than about 475° F.

3. The method of claim 1 wherein said free oxygen passed into said massive, stationary catalyst zone is contained in combustion products produced by burning a fuel in the presence of excess air.

4. The method of claim 1 wherein said free oxygen is contained in air passed into said catalyst zone after said hot combustion products are passed therethrough.

5. The method of claim 1 wherein the catalyst comprises between about 2 and about 10 percent of nickel.

6. In a cyclic process wherein a massive, stationary zone of catalyst comprising a metal selected from the group consisting of cobalt and nickel is alternately heated by passing heating gases thereinto, and then said heated stationary catalyst zone, with said metal in elemental form, and the heat stored therein are employed to effect the catalytic reformation of a hydrocarbon into a combustible gas comprising hydrogen and carbon monoxide, the method of heating said stationary catalyst zone and controlling temperatures therein which comprises burning a fuel and passing the resulting hot combustion producas into and through said stationary catalyst zone to store therein a portion of the heat required for the reaction and passing free oxygen into said stationary catalyst zone in the same direction as the said passage of hot combustion products to oxidize elemental metal in said catalyst zone with the generation of heat in situ in said stationary catalyst zone, and then passing oxidizable gas into said stationary catalyst zone in an amount to reduce said oxidized metal to elemental form with the simultaneous exothermic oxidation of said oxidizable gas in said stationary catalyst zone by virtue of the oxygen in said oxidized metal, the amount of free oxygen passed into said catalyst zone being sufficient to provide, as the result of said metal-oxidation, metal-reduction and gas-oxidizing sequence, another portion of heat amounting to between about 10% and about 50% of the total heat supplied to said catalyst zone, the heat distribution in said stationary catalyst zone by virtue of said first-mentioned portion of heat supplied tending to provide a falling temperature gradient from the entrance to the exit of said stationary catalyst zone and the heat distribution in said stationary catalyst zone by virtue of said second-mentioned portion of heat supplied tending to provide a rising temperature gradient, the proportions of each portion of heat supplied being controlled to provide, without overheating said entrance portion of the catalyst zone, a mean temperature differential between the entrance and exit portions of the catalyst zone substantially less than that resulting from the heating of said stationary catalyst zone solely by passing hot oxygen-free combustion products therethrough in the stated direction.

7. The process of claim 6 wherein the catalyst comprises nickel, and wherein the amount of free oxygen passed into the catalyst zone is between about 15 and about 180 cubic feet thereof per thousand cubic feet of hydrogen plus carbon monoxide produced.

8. The process of claim 6 wherein the catalyst comprises nickel, and wherein the amount of free oxygen passed into the catalyst zone is between about 50 and about 100 cubic feet thereof per thousand cubic feet of hydrogen and carbon monoxide produced.

References Cited in the file of this patent
UNITED STATES PATENTS

| Number | Name | Date |
|---|---|---|
| 1,711,036 | Beekley | Apr. 30, 1929 |
| 1,972,898 | Odell | Sept. 11, 1934 |
| 1,992,909 | Davis | Feb. 26, 1935 |
| 2,230,467 | Nelly et al. | Feb. 4, 1941 |
| 2,284,603 | Belchetz et al. | May 26, 1942 |
| 2,344,770 | Gunness | Mar. 21, 1944 |
| 2,368,507 | Welty, Jr. | Jan. 30, 1945 |
| 2,425,754 | Murphree et al. | Aug. 19, 1947 |
| 2,577,563 | Belchetz | Dec. 4, 1951 |
| 2,583,164 | Watson | Jan. 22, 1952 |